US008622401B2

(12) United States Patent
Puzio et al.

(10) Patent No.: US 8,622,401 B2
(45) Date of Patent: Jan. 7, 2014

(54) BIT RETENTION DEVICE

(75) Inventors: Daniel Puzio, Baltimore, MD (US);
Robert G. Kusmierski, York, PA (US);
Jeremy Torok, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 1107 days.

(21) Appl. No.: 12/394,426

(22) Filed: Feb. 27, 2009

(65) Prior Publication Data
US 2010/0219593 A1 Sep. 2, 2010

(51) Int. Cl.
*B23B 31/22* (2006.01)

(52) U.S. Cl.
USPC ............... 279/30; 279/75; 279/905; 279/906

(58) Field of Classification Search
USPC ............... 279/30, 22, 75, 905, 906, 79
See application file for complete search history.

(56) References Cited

U.S. PATENT DOCUMENTS

| | | | |
|---|---|---|---|
| 1,119,276 A * | 12/1914 | Griffith et al. | 279/75 |
| 1,124,981 A * | 1/1915 | Weaver | 279/75 |
| 1,138,465 A * | 5/1915 | Fegley et al. | 279/82 |
| 1,656,450 A | 1/1928 | Steuer | |
| 1,860,998 A | 5/1932 | Drazick | |
| 1,938,440 A * | 12/1933 | Richard | 279/30 |
| 2,348,611 A | 5/1944 | Davidson | |
| 2,409,899 A | 10/1946 | Resina | |
| 3,019,027 A | 1/1962 | Klein et al. | |
| 3,398,965 A | 8/1968 | Cox | |
| 3,436,086 A | 4/1969 | Glenzer | |
| 3,599,765 A * | 8/1971 | Turner et al. | 192/56.61 |
| 3,726,533 A * | 4/1973 | Lafferty | 279/97 |
| 3,732,026 A * | 5/1973 | Peters | 408/124 |
| 3,767,218 A | 10/1973 | Linthicum et al. | |
| 3,788,658 A | 1/1974 | Benjamin et al. | |
| 3,929,343 A * | 12/1975 | Wanner et al. | 279/81 |
| 4,002,348 A * | 1/1977 | Johnson | 279/75 |
| 4,068,559 A * | 1/1978 | Schmid et al. | 409/233 |
| 4,131,165 A * | 12/1978 | Wanner et al. | 173/48 |
| 4,184,692 A | 1/1980 | Benson et al. | |
| 4,309,042 A | 1/1982 | Fauth et al. | |
| 4,317,578 A * | 3/1982 | Welch | 279/60 |
| 4,347,753 A * | 9/1982 | Claussen et al. | 74/110 |

(Continued)

FOREIGN PATENT DOCUMENTS

| | | |
|---|---|---|
| DE | 1789996 | 6/1959 |
| DE | 1161817 | 1/1964 |

(Continued)

*Primary Examiner* — Eric A Gates
*Assistant Examiner* — Bayan Salone
(74) *Attorney, Agent, or Firm* — Harness, Dickey & Pierce, P.L.C.

(57) ABSTRACT

A bit retention device includes a shaft having a sidewall defining a hexagonal cavity extending from a first end thereof and a ball groove extending through the sidewall and communicating with the hexagonal cavity. A ball is disposed in the ball groove and a ball spring engages the ball and biases the ball toward the first end. An actuator sleeve surrounding the shaft includes an internal ramp engaging the ball. The internal ramp includes a shallow ramp portion having a first angle of inclination with respect to a center axis and a steep ramp portion having a second angle of inclination with respect to said center axis of said shaft that is greater than the first angle of inclination. A spring biased plunger assembly is disposed in the bore for biasing a bit received in the bore in a direction toward the insertion end.

16 Claims, 15 Drawing Sheets

(56) References Cited

U.S. PATENT DOCUMENTS

| | | | |
|---|---|---|---|
| 4,502,824 A * | 3/1985 | Dohse et al. | 409/234 |
| 4,577,875 A | 3/1986 | Miyakawa et al. | |
| 4,588,335 A * | 5/1986 | Pearson, Jr. | 408/239 R |
| 4,629,375 A | 12/1986 | Lieser | |
| 4,669,932 A * | 6/1987 | Hartley | 408/239 R |
| 4,692,073 A | 9/1987 | Martindell | |
| 4,701,083 A * | 10/1987 | Deutschenbaur et al. | 408/240 |
| 4,793,053 A * | 12/1988 | Zuccaro et al. | 279/4.01 |
| 4,824,298 A * | 4/1989 | Lippacher et al. | 408/240 |
| 4,858,939 A | 8/1989 | Riggs | |
| 5,000,631 A * | 3/1991 | Deutschenbaur et al. | 408/240 |
| 5,013,194 A | 5/1991 | Wienhold | |
| 5,029,505 A * | 7/1991 | Holliday | 83/652 |
| 5,062,749 A * | 11/1991 | Sheets | 279/75 |
| 5,188,378 A * | 2/1993 | Erlenkeuser | 279/22 |
| 5,199,833 A * | 4/1993 | Fehrle et al. | 408/239 R |
| 5,284,069 A * | 2/1994 | Wellman | 76/107.1 |
| 5,398,946 A * | 3/1995 | Quiring | 279/30 |
| 5,447,397 A * | 9/1995 | Asano | 408/59 |
| 5,584,689 A * | 12/1996 | Loge | 433/128 |
| 5,709,391 A * | 1/1998 | Arakawa et al. | 279/19.4 |
| 5,709,393 A * | 1/1998 | von Keudell et al. | 279/97 |
| 5,906,378 A * | 5/1999 | Nordquist | 279/4.06 |
| 5,934,384 A | 8/1999 | Wang | |
| 5,951,024 A * | 9/1999 | Montjoy et al. | 279/43 |
| 5,951,026 A * | 9/1999 | Harman et al. | 279/143 |
| 5,984,596 A * | 11/1999 | Fehrle et al. | 408/226 |
| 5,996,452 A * | 12/1999 | Chiang | 81/429 |
| 5,997,225 A * | 12/1999 | Young et al. | 409/182 |
| 6,053,675 A * | 4/2000 | Holland et al. | 408/239 R |
| 6,074,140 A * | 6/2000 | Cook | 408/240 |
| 6,079,716 A * | 6/2000 | Harman et al. | 279/75 |
| 6,126,370 A | 10/2000 | Wheeler et al. | |
| 6,135,462 A * | 10/2000 | Robison | 279/137 |
| 6,179,300 B1 * | 1/2001 | Baumann et al. | 279/19.4 |
| 6,193,242 B1 | 2/2001 | Robison | |
| 6,199,872 B1 | 3/2001 | Hasan | |
| 6,224,303 B1 | 5/2001 | Wheeler et al. | |
| 6,234,491 B1 * | 5/2001 | Wheeler | 279/143 |
| 6,241,026 B1 * | 6/2001 | Wache et al. | 173/132 |
| 6,261,035 B1 | 7/2001 | Moores, Jr. et al. | |
| 6,270,085 B1 * | 8/2001 | Chen et al. | 279/22 |
| 6,293,559 B1 * | 9/2001 | Harman et al. | 279/75 |
| 6,311,989 B1 * | 11/2001 | Rosanwo | 279/75 |
| 6,325,393 B1 | 12/2001 | Chen et al. | |
| 6,343,901 B2 | 2/2002 | Wheeler et al. | |
| 6,354,177 B2 | 3/2002 | Peters | |
| 6,364,033 B1 * | 4/2002 | Hung et al. | 173/217 |
| 6,382,636 B1 * | 5/2002 | Walker | 279/60 |
| 6,390,739 B1 * | 5/2002 | O'Banion | 408/239 R |
| 6,457,916 B2 * | 10/2002 | Wienhold | 408/240 |
| 6,464,234 B2 * | 10/2002 | Frauhammer et al. | 279/19.4 |
| 6,474,656 B1 * | 11/2002 | Thomas | 279/30 |
| 6,517,297 B2 * | 2/2003 | Cochran et al. | 408/226 |
| 6,520,050 B1 * | 2/2003 | Gildroy | 81/44 |
| 6,520,508 B1 * | 2/2003 | Jordan | 279/46.7 |
| 6,524,035 B1 * | 2/2003 | Robison | 408/211 |
| 6,543,959 B1 | 4/2003 | Jore | |
| 6,622,597 B2 * | 9/2003 | Chen | 81/58.3 |
| 6,637,755 B2 * | 10/2003 | Chen et al. | 279/22 |
| 6,651,990 B2 * | 11/2003 | Higasi et al. | 279/19.4 |
| 6,666,114 B1 * | 12/2003 | Lin | 81/438 |
| 6,688,610 B2 * | 2/2004 | Huggins et al. | 279/22 |
| 6,695,321 B2 | 2/2004 | Bedi et al. | |
| 6,722,667 B2 | 4/2004 | Cantlon | |
| 6,755,423 B2 | 6/2004 | Chiu | |
| 6,786,685 B2 * | 9/2004 | Schaub et al. | 408/240 |
| 6,834,864 B2 * | 12/2004 | Girardeau | 279/60 |
| 6,860,489 B2 | 3/2005 | Chen | |
| 6,863,280 B2 | 3/2005 | Chiu | |
| 6,902,358 B2 * | 6/2005 | Thomas | 408/226 |
| 6,913,089 B2 * | 7/2005 | Stirm | 173/104 |
| 6,929,266 B2 | 8/2005 | Peters et al. | |
| 6,973,858 B2 * | 12/2005 | Huang | 81/177.85 |
| 6,986,517 B2 * | 1/2006 | Lin | 279/74 |
| 7,051,635 B2 * | 5/2006 | Morehead | 83/698.31 |
| 7,063,332 B2 * | 6/2006 | Muller | 279/75 |
| 7,086,813 B1 | 8/2006 | Boyle et al. | |
| 7,111,530 B2 * | 9/2006 | Huang | 81/438 |
| 7,121,774 B2 * | 10/2006 | Hirt et al. | 408/240 |
| 7,156,187 B1 * | 1/2007 | Townsan | 173/1 |
| 7,159,493 B1 | 1/2007 | Huang | |
| 7,222,862 B2 * | 5/2007 | Buchholz et al. | 279/19.3 |
| 7,250,023 B2 * | 7/2007 | Bai | 483/30 |
| 7,287,449 B2 * | 10/2007 | Abel et al. | 81/177.2 |
| 7,290,470 B1 * | 11/2007 | Peters | 81/439 |
| 7,306,396 B1 * | 12/2007 | Chen | 403/327 |
| 7,308,948 B2 * | 12/2007 | Furuta | 173/48 |
| 7,316,404 B1 * | 1/2008 | Walker | 279/60 |
| 7,380,612 B2 * | 6/2008 | Furuta | 173/29 |
| 7,380,613 B2 * | 6/2008 | Furuta | 173/48 |
| 7,387,054 B2 * | 6/2008 | Rajotte | 81/429 |
| 7,424,841 B2 * | 9/2008 | Liu | 81/438 |
| 7,500,811 B2 * | 3/2009 | Pfob | 408/56 |
| 7,503,734 B2 * | 3/2009 | Puzio | 408/240 |
| 7,597,155 B2 * | 10/2009 | Ullrich et al. | 173/29 |
| 7,654,779 B2 * | 2/2010 | Sasaki et al. | 408/240 |
| 7,810,817 B1 * | 10/2010 | Gao | 279/75 |
| 7,918,286 B2 * | 4/2011 | Nagasaka et al. | 173/93 |
| 2001/0033777 A1 * | 10/2001 | Peters | 408/12 |
| 2003/0057661 A1 * | 3/2003 | Thomas | 279/30 |
| 2003/0230862 A1 * | 12/2003 | Peters et al. | 279/82 |
| 2004/0013488 A1 * | 1/2004 | Schaub et al. | 409/239 |
| 2004/0094909 A1 * | 5/2004 | Chiu | 279/80 |
| 2005/0036844 A1 * | 2/2005 | Hirt et al. | 408/240 |
| 2006/0048613 A1 | 3/2006 | Abel et al. | |
| 2006/0097464 A1 * | 5/2006 | Strauch et al. | 279/75 |
| 2006/0111723 A1 * | 5/2006 | Chapolini et al. | 606/80 |
| 2007/0152408 A1 * | 7/2007 | Peters | 279/143 |
| 2007/0204730 A1 * | 9/2007 | Rajotte | 81/429 |
| 2008/0072718 A1 | 3/2008 | Liu | |
| 2008/0184852 A1 * | 8/2008 | Peters | 81/439 |
| 2008/0184854 A1 * | 8/2008 | Peters | 81/451 |
| 2009/0008886 A1 * | 1/2009 | Shu | 279/103 |
| 2010/0282485 A1 * | 11/2010 | Puzio et al. | 173/217 |
| 2010/0308547 A1 * | 12/2010 | Fukinuki et al. | 279/134 |

FOREIGN PATENT DOCUMENTS

| | | | |
|---|---|---|---|
| DE | 2117628 A1 | 10/1972 | |
| DE | 2629472 | 1/1978 | |
| DE | 2934428 | 3/1981 | |
| DE | 3243389 | 5/1984 | |
| DE | 3324756 | 1/1985 | |
| DE | 4210911 A1 | 10/1993 | |
| DE | 4243650 | 6/1994 | |
| DE | 4403906 A1 | 9/1994 | |
| DE | 4427933 A1 | 11/1995 | |
| DE | 19932369 | 1/2001 | |
| DE | 20106986 | 9/2001 | |
| DE | 10105406 A1 | 8/2002 | |
| DE | 10219418 A1 | 11/2003 | |
| DE | 10219418 A1 * | 11/2003 | B23B 31/02 |
| DE | 202008011435 U1 | 1/2009 | |
| DE | 202008015046 U1 | 3/2009 | |
| DE | 102007048822 A1 | 4/2009 | |
| DE | 202009001905 U1 | 7/2009 | |
| DE | 202009009115 U1 | 11/2009 | |
| DE | 202009017128 U1 | 3/2010 | |
| EP | 0134975 | 3/1985 | |
| EP | 0175088 A1 | 3/1986 | |
| EP | 0325087 A1 | 7/1989 | |
| EP | 0462257 | 12/1991 | |
| EP | 00959587 A2 | 11/1999 | |
| EP | 1043101 A2 | 10/2000 | |
| EP | 1123172 A1 | 8/2001 | |
| EP | 1218135 A1 | 7/2002 | |
| EP | 1369194 A2 | 12/2003 | |
| EP | 1375071 A2 | 1/2004 | |
| EP | 1409207 A2 | 4/2004 | |
| EP | 1557254 | 7/2005 | |
| EP | 1671729 A2 | 6/2006 | |
| EP | 1690618 | 8/2006 | |
| EP | 1803515 A2 | 7/2007 | |

(56) References Cited

FOREIGN PATENT DOCUMENTS

| | | |
|---|---|---|
| EP | 1880801 A1 | 1/2008 |
| EP | 1897658 | 3/2008 |
| EP | 01913150 A2 | 4/2008 |
| EP | 1955819 A1 | 8/2008 |
| EP | 1955820 A1 | 8/2008 |
| EP | 2067577 A1 | 6/2009 |
| EP | 2151304 A2 | 2/2010 |
| EP | 2151304 A2 * | 2/2010 ............. B25B 23/00 |
| GB | 2275216 A | 8/1994 |
| JP | 2004106473 A | 4/2004 |
| WO | 00/00314 A1 | 1/2000 |
| WO | 0115842 A1 | 3/2001 |
| WO | 01/64400 A1 | 9/2001 |
| WO | WO-03018263 | 3/2003 |
| WO | 2004028402 A2 | 4/2004 |

* cited by examiner

BIT RETENTION DEVICE

FIELD

The present disclosure relates to power or hand tool bit retention devices, variously known as "auxiliary chucks," "chucks," "adapters," or "bit holders" for removably receiving tool bits, such as fastener drivers, drill bits, or the like, for rotation therewith when the power tool is actuated or the hand tool is manually rotated. More particularly, the present disclosure relates to a bit retention device configured for rapid and easy insertion and removal of a bit.

BACKGROUND AND SUMMARY

This section provides background information related to the present disclosure which is not necessarily prior art.

Bit retention devices for power and hand tools have become increasingly common, especially as the need and desirability of wider versatility and the use of power tools and hand tools has increased. Such bit retention devices allow the hand or power tool to be used with any of a number of interchangeable bits. This, in turn, has resulted in demands for greater speed, convenience, and ease for insertion and removal of tool bits from the bit retention device.

In one exemplary type of conventional bit retention device, one or more detent balls are positioned within a hollow, barrel-shaped tool bit holder body and are resiliently biased into engagement with a circumferentially-extending groove or recess on the shank of the tool bit. Although this basic design has performed well, such conventional quick-release bit retention devices frequently require the operator to actuate a sleeve, collar, or other component part during both the insertion and the removal of the tool bit.

Accordingly, the present disclosure seeks to provide a bit retention device that requires the operator to actuate its components only upon tool bit removal. A "snap-in" type of bit retention device is provided for a drill, driver, or other rotary hand or power tool. The bit retention device includes a shaft having a sidewall defining a hexagonal cavity extending from a first end thereof and a ball groove extending through the sidewall and communicating with the hexagonal cavity. A ball is disposed in the ball groove and a ball spring engages the ball and biases the ball toward the first end. An actuator sleeve surrounds the shaft and includes an internal ramp engaging the ball. The internal ramp includes a shallow ramp portion having a first angle of inclination with respect to a center axis of the shaft and a steep portion having a second angle of inclination with respect to the center axis of the shaft that is greater than the first angle of inclination. The steep portion includes a smaller diameter than the shallow ramp portion.

According to another aspect, the present disclosure provides a bit retention device, wherein a spring biased plunger biases the bit out of engagement with the ball when the actuator sleeve is pulled forward.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
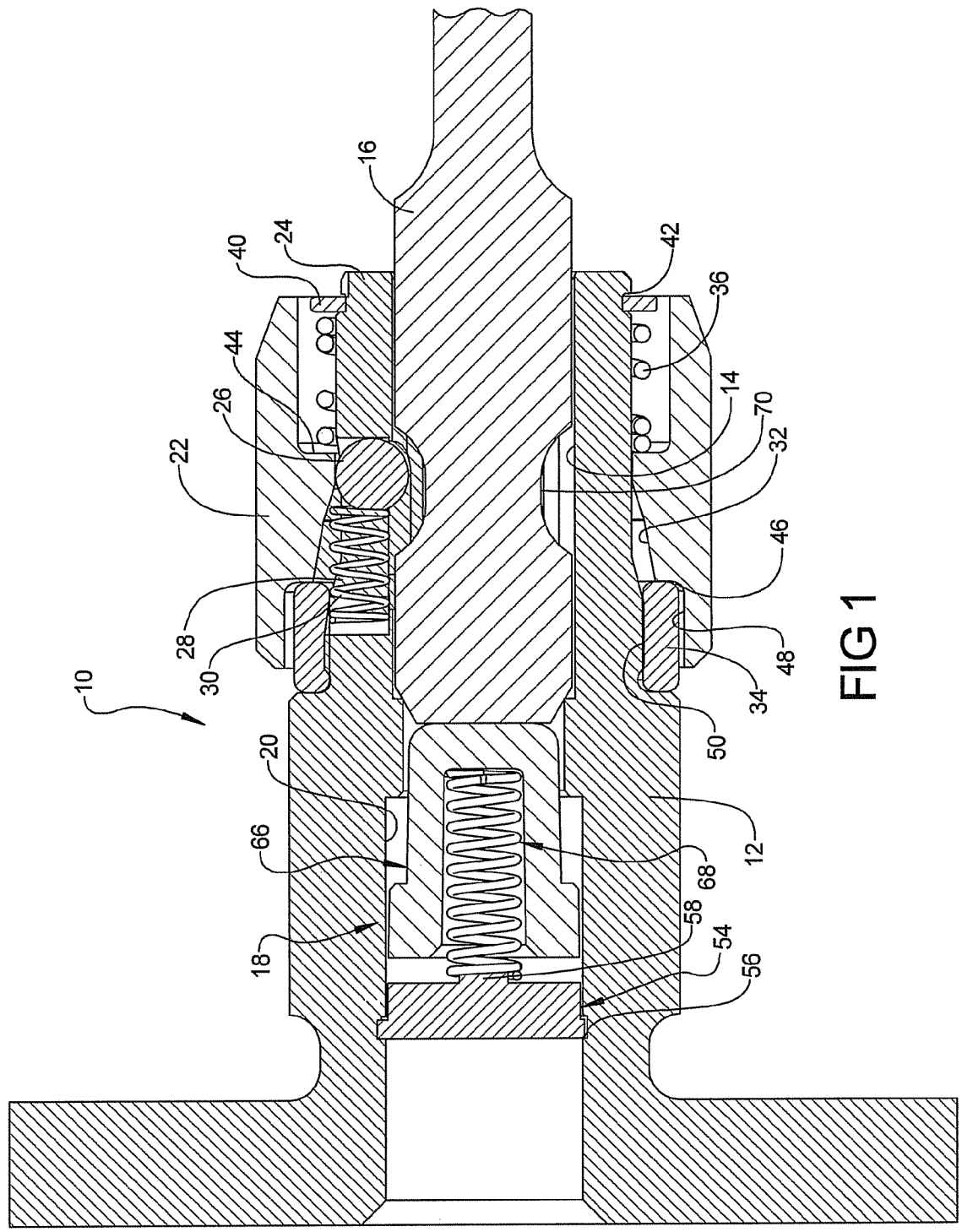
FIG. 1 is a longitudinal cross-sectional view of a bit retention device according to the principles of the present disclosure.
Figure 2:
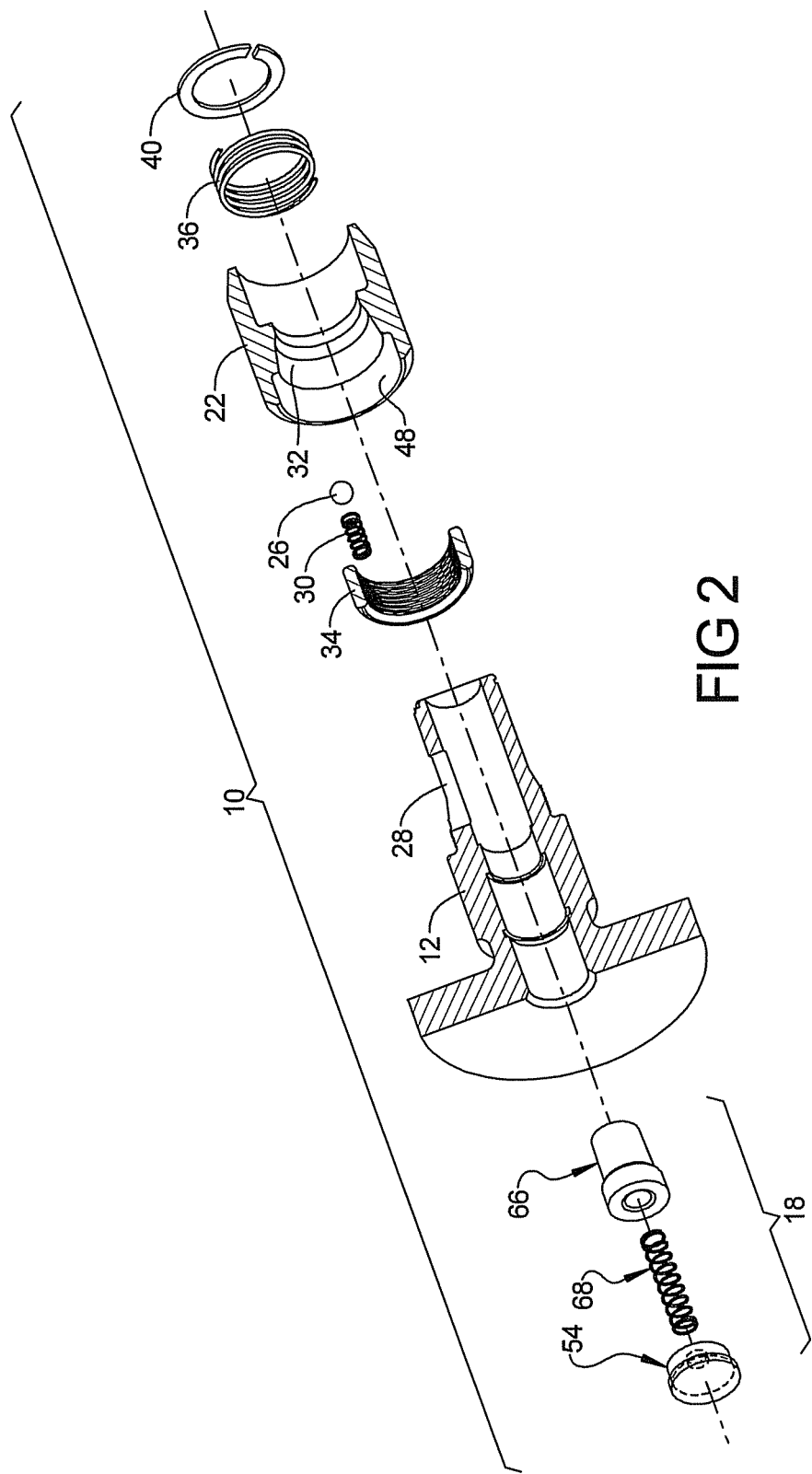
FIG. 2 is an exploded perspective view of the bit retention device shown in FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Spatially relative terms, such as "inner," "outer," "forward," "rearward," "lower," "above," "upper" and the like, may be used herein for ease of description to describe one element or feature's relationship to another element(s) or feature(s) as illustrated in the figures.

With reference to the accompanying Figures, the bit retention device 10 according to the principles of the present disclosure will now be described. The bit retention device 10 includes a shaft 12 defining a polygonal cavity 14 for receiving a tool bit or the like 16. The polygonal cavity 14 can be hexagonal. A plunger sub-assembly 18 is received in a bore 20 extending from the polygonal cavity 14. An actuator sleeve 22 is disposed around a first end 24 of the shaft 12 and engages a ball 26 that is received in a ball groove 28 of the shaft 12. A ball spring 30 is disposed in the ball groove 28 and biases the ball 26 against an interior ramp 32 of the actuator sleeve 22. A ball spring retainer sleeve 34 surrounds the shaft 12 and retains a second end of the ball spring 30 within the ball groove 28.

An actuator spring 36 biases the actuator sleeve 22 in a rearward direction relative to the first end 24 of the shaft 12. A retainer clip 40 is received in a recessed groove 42 in the first end 24 of the shaft 12 and disposed against a forward end of the actuator spring 36. A second end of the actuator spring 36 is received against an interior shoulder portion 44 of the actuator sleeve 22 in order to bias the actuator sleeve 22 in a rearward direction relative to the first end 24 of the shaft 12. The actuator sleeve 22 includes a rear shoulder portion 46 that can be located adjacent to the ramp 32 and can engage the ball spring retainer sleeve 34 at a forward end thereof to limit rearward movement of the actuator sleeve 22. The actuator sleeve 22 can include a rearwardly extending cylindrical guide portion 48 that engages an outer surface of the ball spring retainer sleeve 34 for sliding engagement therewith. The ball spring retainer sleeve 34 can include an internal diameter portion 50 that snuggly receives the shaft 12 therein.

Figure 3:
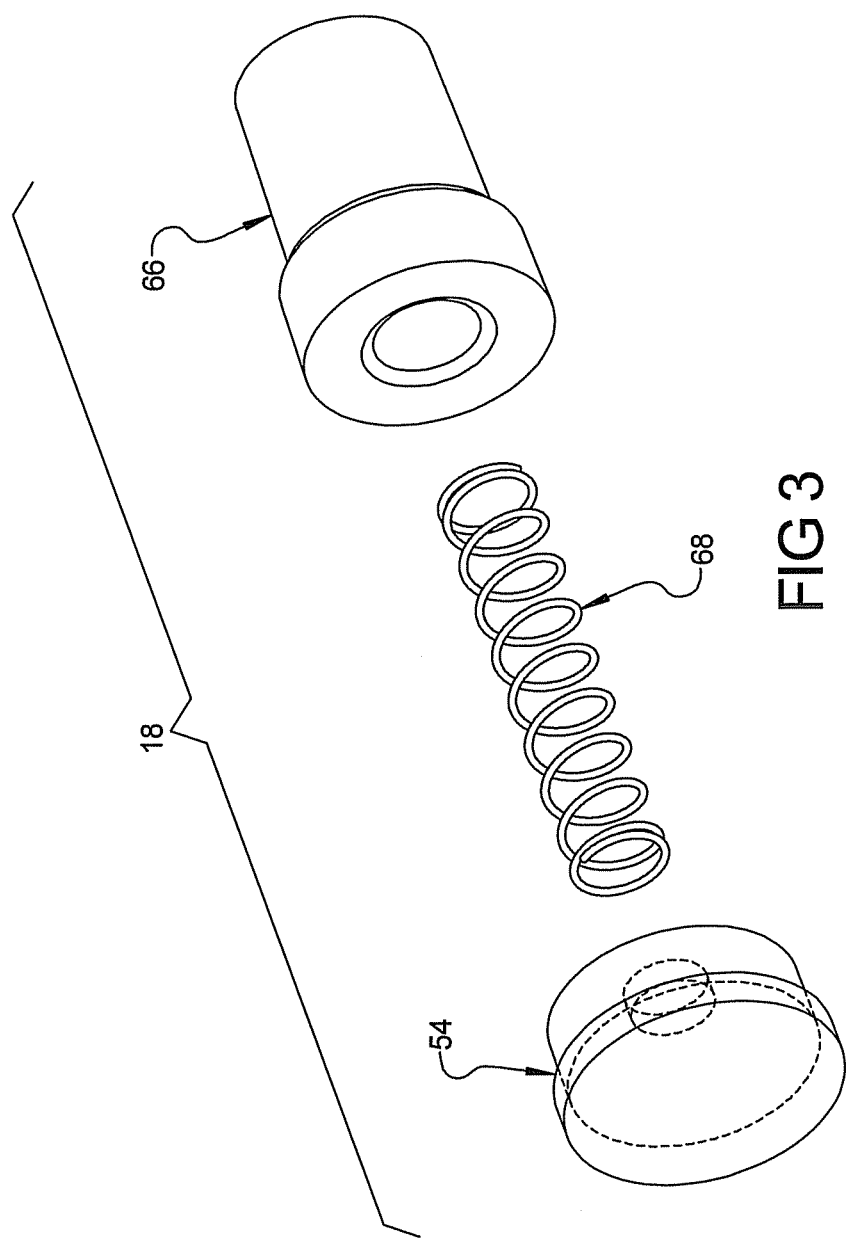
FIG. 3 is an exploded perspective view of the plunger sub-assembly according to the principles of the present disclosure.

With reference to FIG. 3, the plunger assembly 18 can include a spring seat 54 that is adapted to be press fit into a receiving groove 56 within the bore 20 as illustrated in FIG. 1. The spring seat 54 includes a center post 58 which is adapted to receive a plunger spring 68 thereon. A plunger member 66 is disposed against a forward end of the plunger spring 68.

The plunger member 66 has a recessed cavity 60 for receiving the plunger spring 68. The plunger sub-assembly 18 is inserted into the rear end of the bore 20 so that the forward end of the spring 68 engages the plunger member 66. The spring seat 54 is inserted into the bore 20 until the spring seat 54 engages the receiving groove 56 within the bore 20. The plunger member 66 is designed to slide freely within the bore 20 while the spring 68 biases the plunger member 66 toward the first end 24 of shaft 12.

Figure 4:
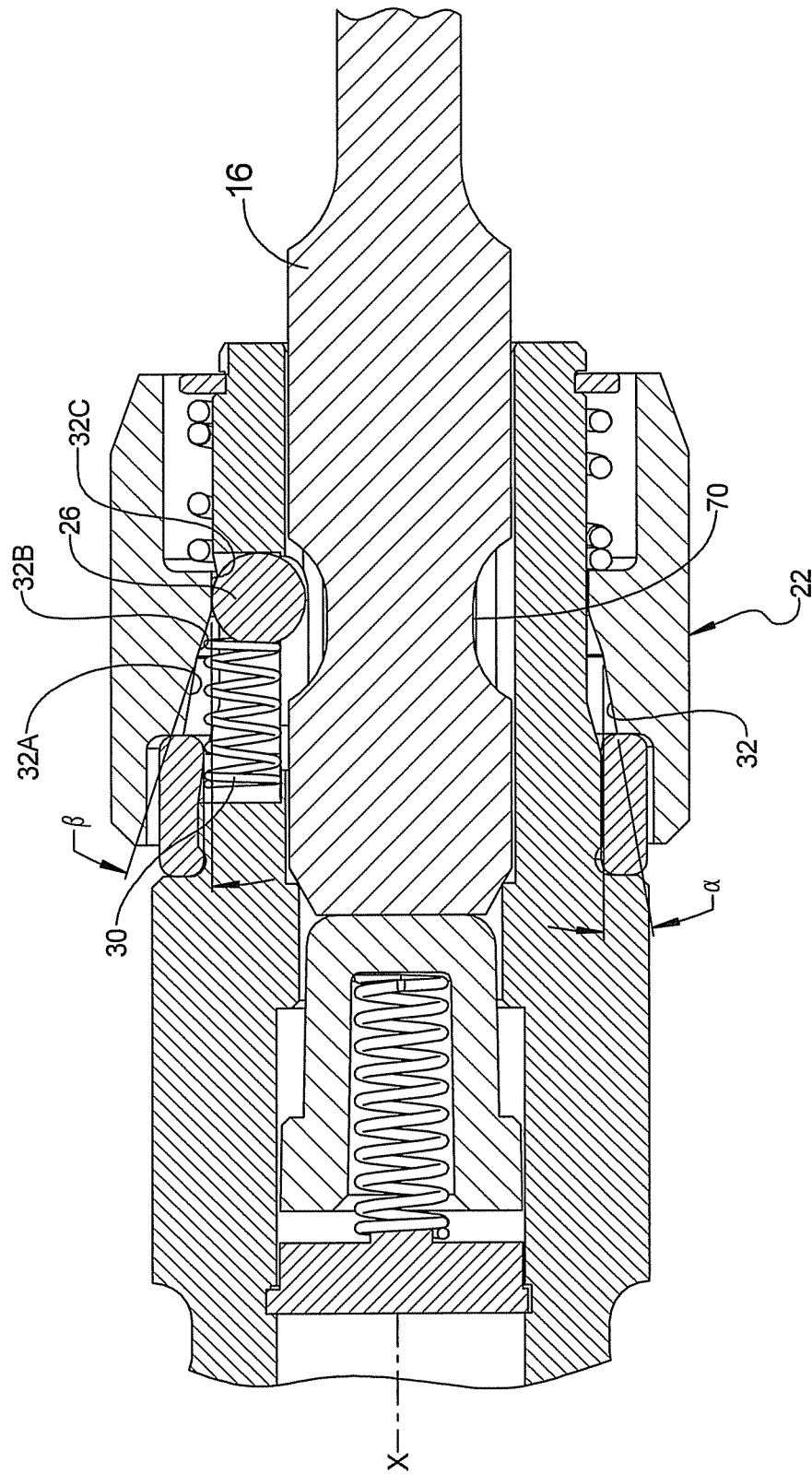
FIG. 4 is an enlarged cross-sectional view of the bit retention device shown in FIG. 1 and illustrating the details of the ramp on the interior surface of the actuation sleeve, according to the principles of the present disclosure.

With reference to FIG. 4, the ramp 32 of the actuator sleeve 22 will now be described. The ramp 32 includes a shallow ramp portion 32A and a steep ramp portion 32B. The shallow ramp portion 32A has a first angle of inclination $\alpha$ relative to the central axis X of the shaft 12 that can be between 5 and 15 degrees, and more particularly about 10 degrees. The steep ramp portion 32B has a second angle of inclination $\beta$ relative to the central axis X that is larger than the angle of inclination $\alpha$ of the shallow ramp portion 32A. The steep ramp portion 32B can have an angle of inclination $\beta$ relative to the central axis X that is between 13 and 23 degrees, and more particularly about 18 degrees. The ramp portion 32 can further include a third ramp portion 32C that is generally parallel to the axis X of the shaft 12 thereby defining a cylindrical wall portion thereon. The angles and positions of ramp portions 32A and 32B are such that they allow the ball to pass the corner of the groove 70 of the power bit 16. In other words, the dimensions from the corner of the groove to ramp surfaces 32A and 32B are greater than the ball diameter when the sleeve is seated in its rearward position. The spring 30 urges the ball 26 past the corner of the groove in the power bit to its fully forward position. The ramp surface 32B and surface 32C direct the ball into greater engagement with the groove 70 in the power bit 16.

During assembly, the plunger sub-assembly 18 is inserted into the bore 20 until the spring seat 54 is disposed within the receiving groove 56 within the bore 20. The ball spring retaining sleeve 34 is then slid over the shaft 12, and the ball spring 30 and ball 26 are inserted into the ball groove 28 so that the ball spring retaining sleeve 34 overlaps the rear end of the ball spring 30 in order to retain the ball spring 30 within the ball groove 28. The actuator sleeve 22 is then inserted onto the end of the shaft 12 and the actuator spring 36 is slid over the end of the shaft 12 inside of the actuator sleeve 22 so that the actuator spring 36 abuts against the shoulder portion 44 of the actuator sleeve 22. The retaining clip 40 is then installed on the shaft 12 so that the retainer clip 40 is received in the recessed groove 42 at the first end 24 of the shaft 12.

It should be noted that the shaft 12 can be designed to be permanently installed on a rotating shaft of a power tool or can alternatively be designed to be removably engaged from a power tool or a hand tool. The bit retention device 10 can be utilized for retaining various types of hexagonal bits such as screwdriver bits and drill bits.

Figure 5:
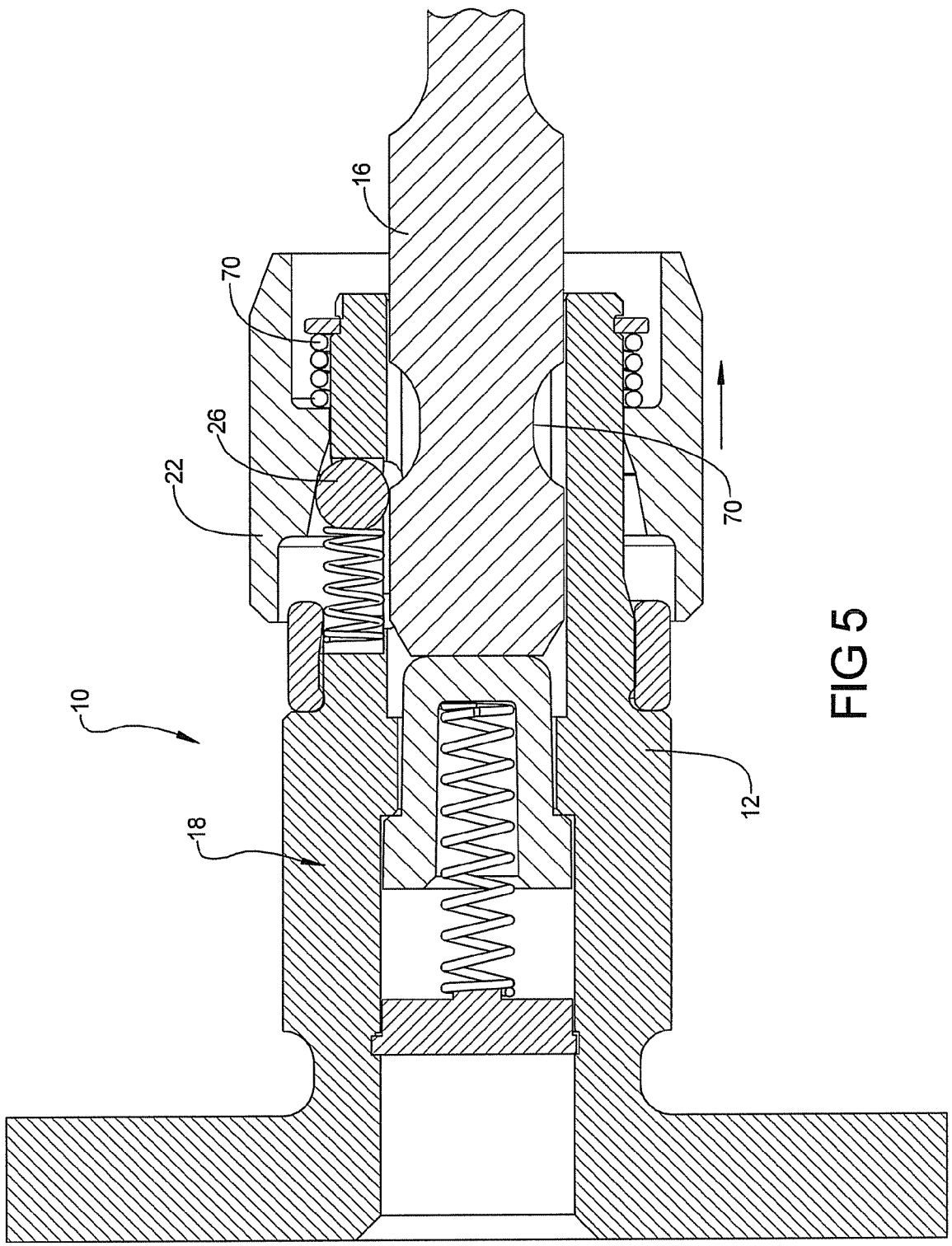
FIG. 5 is a cross-sectional view of the bit holder device shown with the sleeve pulled in a forward release position for allowing the removal of the tool bit.

A common form of bit is referred to as a "power bit" which includes a hexagonal shank portion having an annular radiused groove 70 therein that is designed to receive a ball or other retaining member of a retention device. An exemplary "power bit"-type bit is illustrated in FIGS. 1, 2, and 5-8. When the bit retention device 10 of the present disclosure is utilized for retaining a power bit, the ball 26 is received in the annular groove 70 of the bit 16 as illustrated in FIG. 1. In this position, the ramp portion 32C retains the ball within the annular groove 70 of the bit 16. In order to release the bit 16 from the retention device 10, the actuator sleeve 22 is pulled in a forward direction as illustrated in FIG. 5 so that the ball 26 is able to move radially outward out of the annular groove 70 and the plunger assembly 18 pushes the bit forward so that the ball groove 70 is no longer in alignment with the ball 26. The sleeve 22 can then be released and the bit 16 can be extracted with the same hand, thus making it a simple one hand operation to remove the bit 16.

Figure 6:
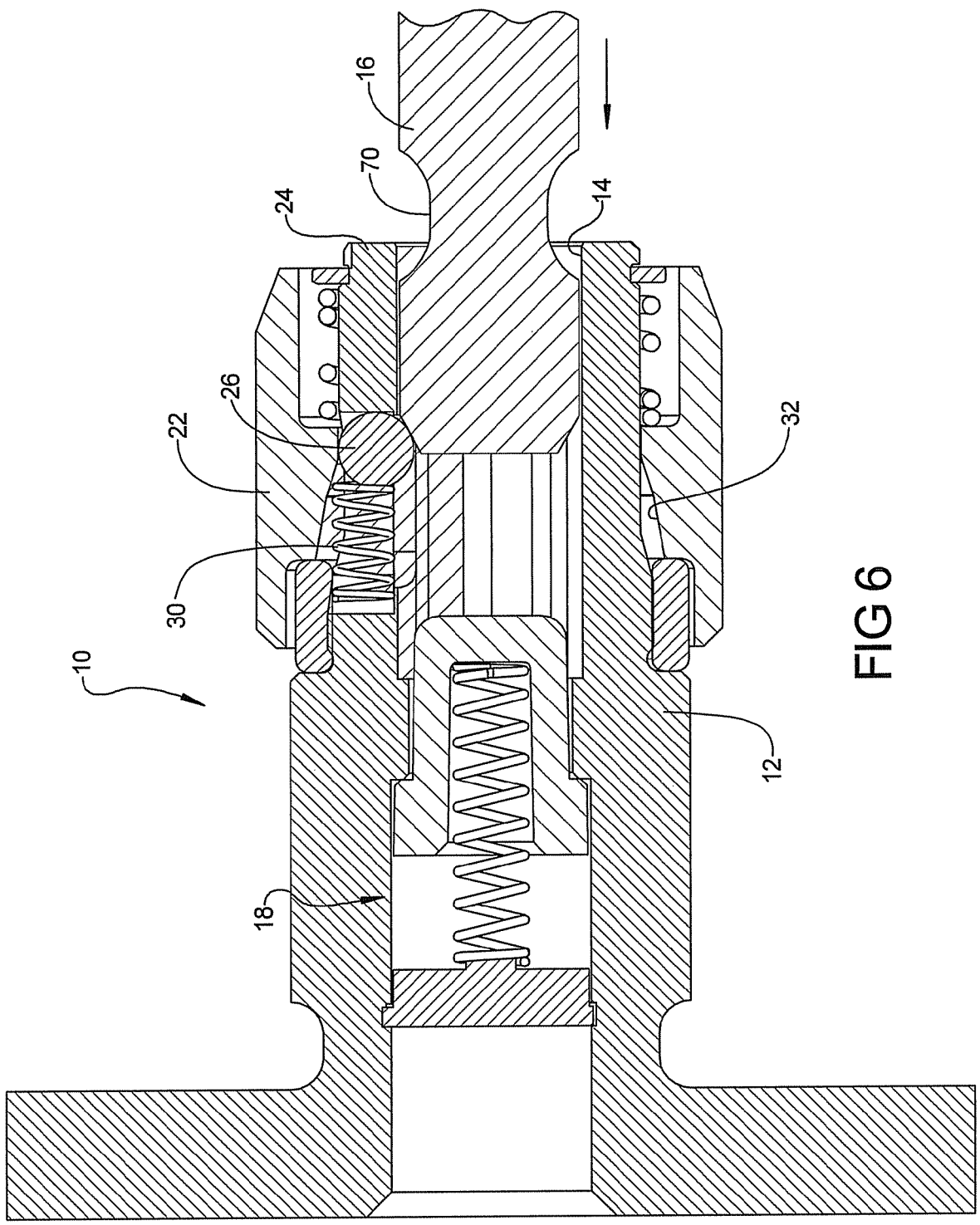
FIG. 6 is a cross-sectional view of the bit holder device with a tool bit being inserted into the bit holder according to the principles of the present disclosure.
Figure 7:
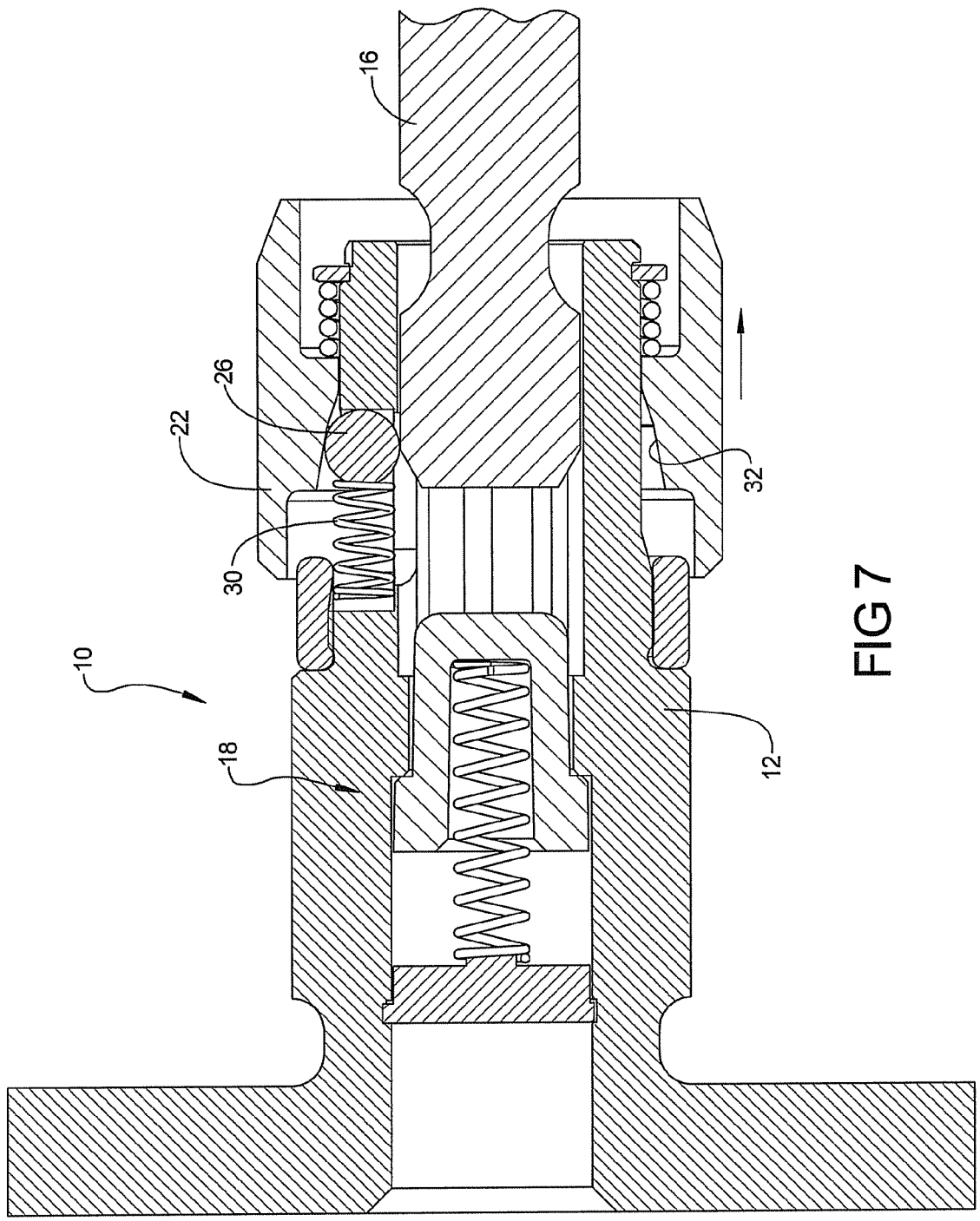
FIG. 7 is a cross-sectional view of the bit holder device with the tool bit being pressed into the bit retention device so that the ball is slid rearward along the ramp portion of the actuator sleeve.
Figure 8:
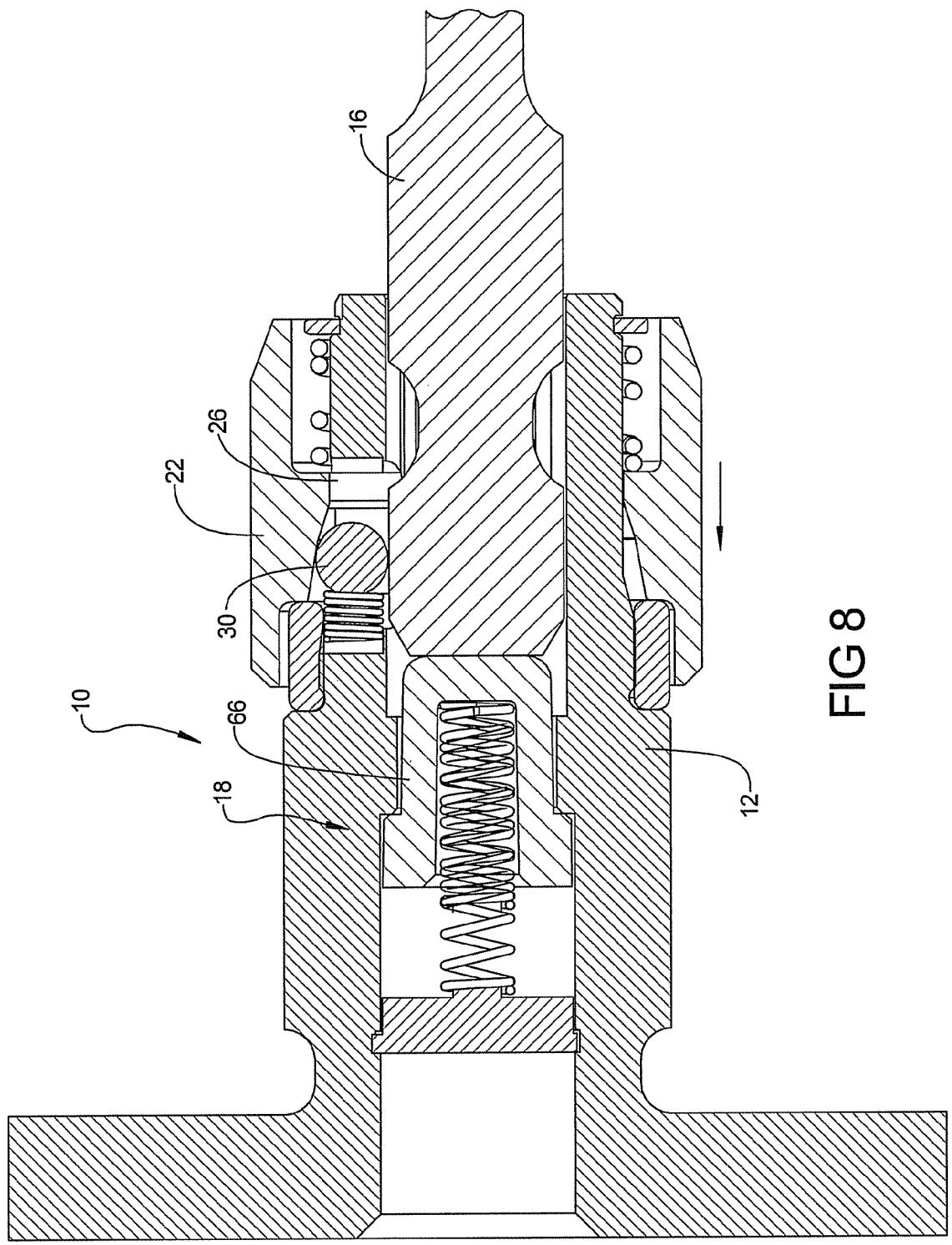
FIG. 8 is a cross-sectional view of the bit retention device with the bit inserted further within the hexagonal cavity prior to the ball being received in the ball groove of the screwdriver bit.

In order to insert a bit into the bit retention device, the bit is inserted into the polygonal cavity 14, as illustrated in FIG. 6, until the end of the bit 16 engages the ball 26, as shown in FIG. 6. The bit 16 is then pressed further inward so that the ball 26 presses against the spring 30 and moves rearward in the ball groove 28 and upward along the ramp 32 of the actuator sleeve 22. Once the ball 26 moves far enough along the ramp 32, the ball 26 rides along a vertex of the hexagonal surface of the bit 16. The bit 16 then presses against the plunger 66 and presses the plunger 66 rearward as illustrated in FIG. 8. The bit 16 is then pressed further inwards to its fully locked position as illustrated in FIG. 1.

Figure 9:
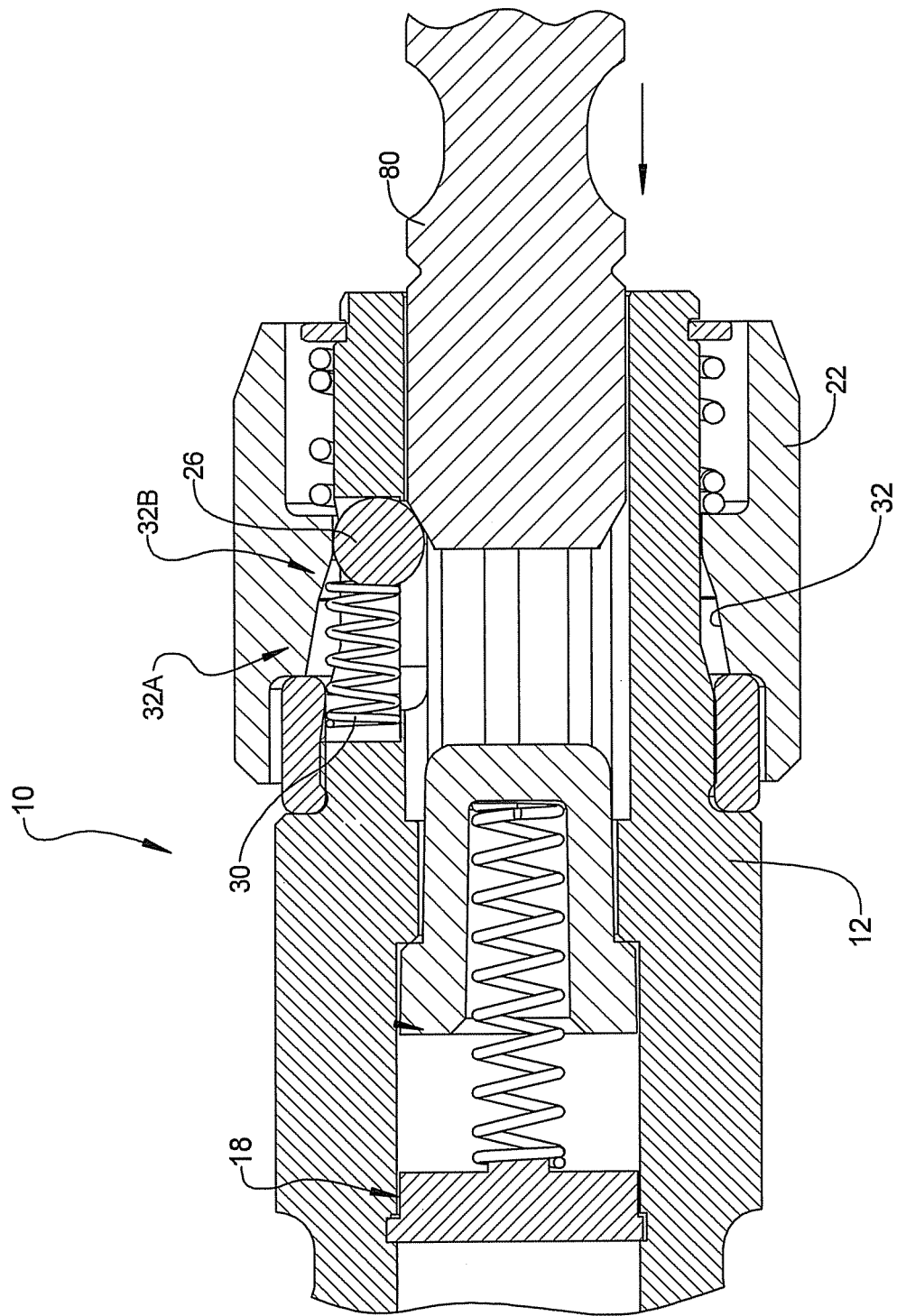
FIG. 9 illustrates a cross-sectional view of the bit retention device having a "bit tip"-type bit being inserted therein according to the principles of the present disclosure.
Figure 10:
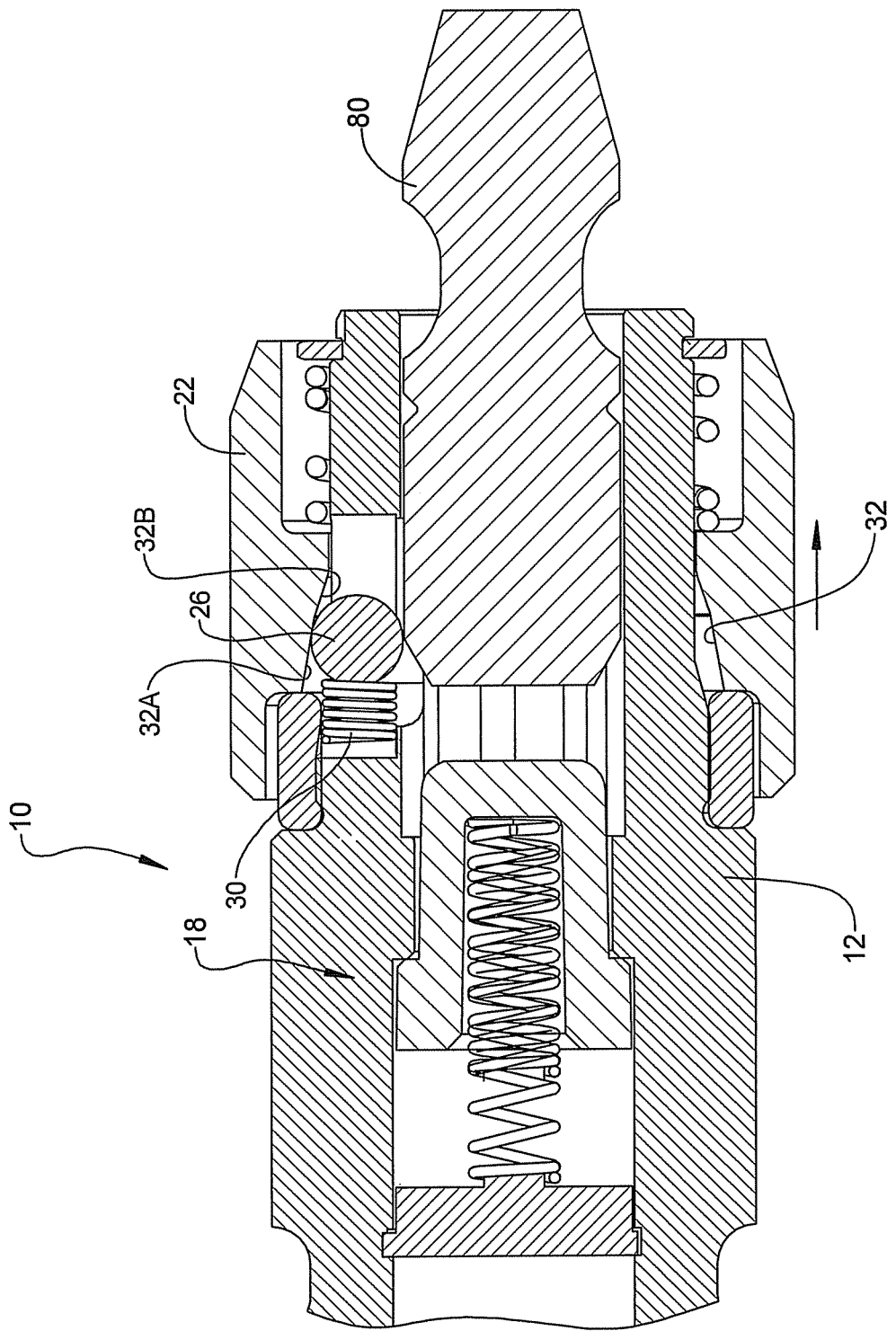
FIG. 10 illustrates the "bit tip"-type being further inserted into the bit retention device with the ball being pushed rearward along the ramp on the interior surface of the actuator sleeve.
Figure 11:
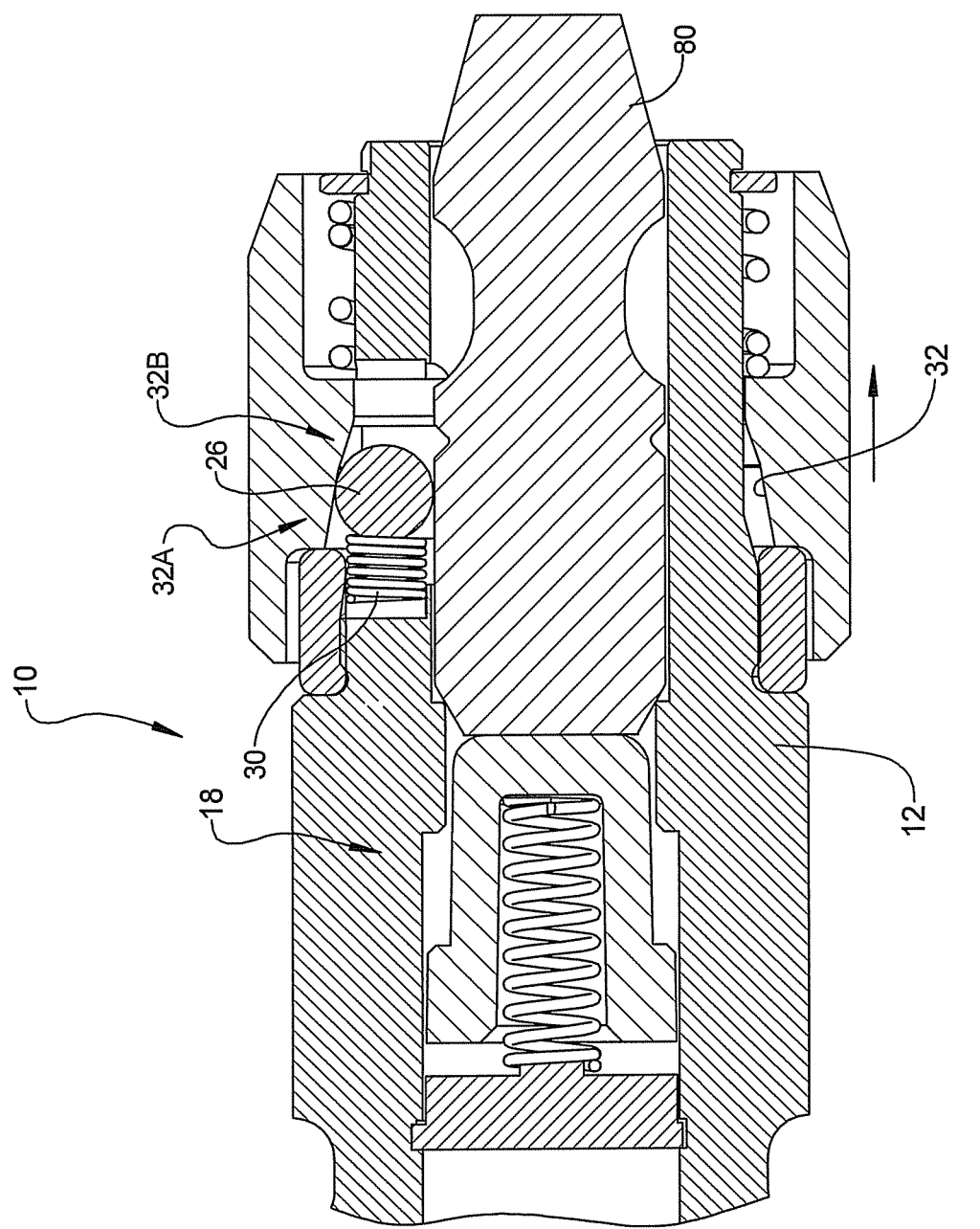
FIG. 11 is a cross-sectional view showing the engagement of a "bit tip"-type screwdriver bit fully inserted into the bit retention device according to the principles of the present disclosure.

Another type of bit is often referred to as a "bit tip" as illustrated by references numeral 80 in FIGS. 9-11. For installation of a bit tip 80 in the bit retention device 10, the bit tip 80 is inserted into the polygonal cavity 14 as illustrated in FIG. 9. As the bit tip 80 engages the ball 26, the ball is pressed rearward, compressing the ball spring 30 and the ball is caused to move relative to the ramp 32 so that the ball 26 can move radially outward as it traverses the ramp 32, as illustrated in FIG. 10. As the ball 26 moves radially outward to a sufficient extent, the bit tip 80 is then able to move freely inward against the biasing force of the plunger assembly 18. The bit tip 80 is then pressed inward to its full extent as illustrated in FIG. 11.

In the fully inserted position, the ball 26 is biased against the shallow ramp portion 32A of the ramp 32 of the actuator sleeve 22. The smaller angle of inclination α of the shallow ramp portion 32A provides a radial force against the ball 26 that is sufficient for retaining the bit tip 80 within the bit retention device 10 without the ball 26 having to engage any recess on the bit tip 80.

In order to release the bit tip 80 from the bit retention device 10, the actuator sleeve 22 is pulled in a forward direction and the plunger 18 biases the bit tip forward a sufficient amount for the bit tip 80 to be removed by the user. The use of a ramp 32 having a shallow ramp portion 32A and a steep ramp portion 32B allows the bit retention device 10 to be utilized with various kinds of tool bits wherein the ball 26 is able to be received in an annular groove of a "power bit"-type bit with ramp portion 32B causing the ball 26 to move radially inward to a greater extent than the shallow ramp portion 32A so that the ball is properly received within the ball groove 70 of the power bit. The greater angle of inclination of the steep ramp portion 32B allows the ramp 32 to be shorter and therefore the actuator sleeve 22 can be more compact. The shallow ramp portion 32A provides a sufficient radial inward force to retain a "bit tip"-type bit within the bit retention device 10 without the ball 26 needing to engage a recess on the bit.

The spring biased ball 26 allows a user to insert a bit 16 into the bit retention device 10 without having to use a second hand to simultaneously engage the actuator sleeve 22. Instead, the user can hold the tool with one hand and insert the bit 16, 80 into the bit retention device with the other hand. In order to release the bit 16, 80 from the bit retention device 10, the actuator sleeve 22 can then be pulled forward and the plunger assembly 18 presses the bit 16, 80 forward a sufficient amount so that the sleeve 22 can be released and the bit 16, 80 can be grasped by the same hand and removed from the bit retention device 10, thus making it a one-hand operation to remove the bit 16. The plunger spring 68 can be provided with a sufficient spring force to cause the bit 16, 80 to be moved forward upon activation of the actuator sleeve 22, but not too strong to eject the bit 16, 80 from the bit retention device.

Figure 12:
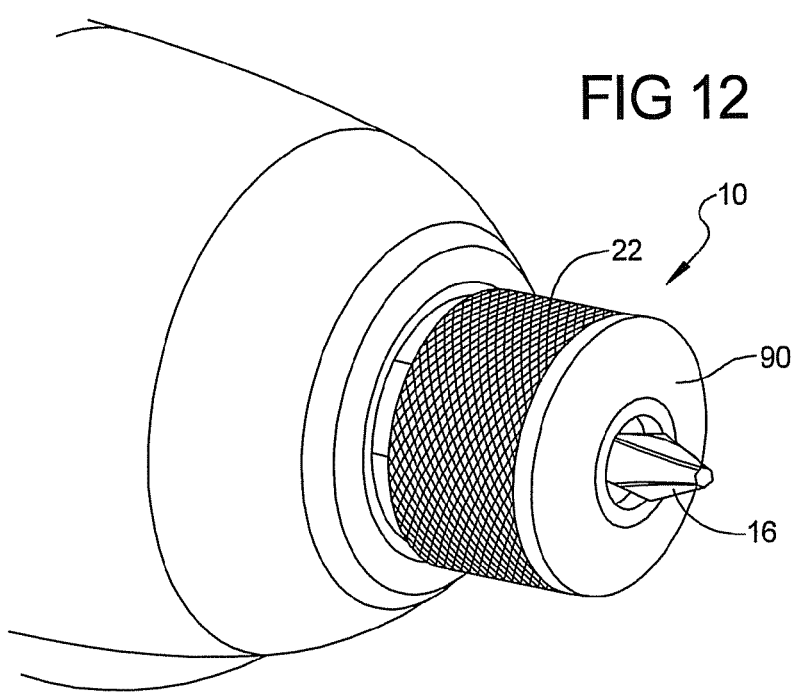
FIG. 12 is a perspective view of a nose magnet applied to the bit retention device according to the principles of the present disclosure.
Figure 13:
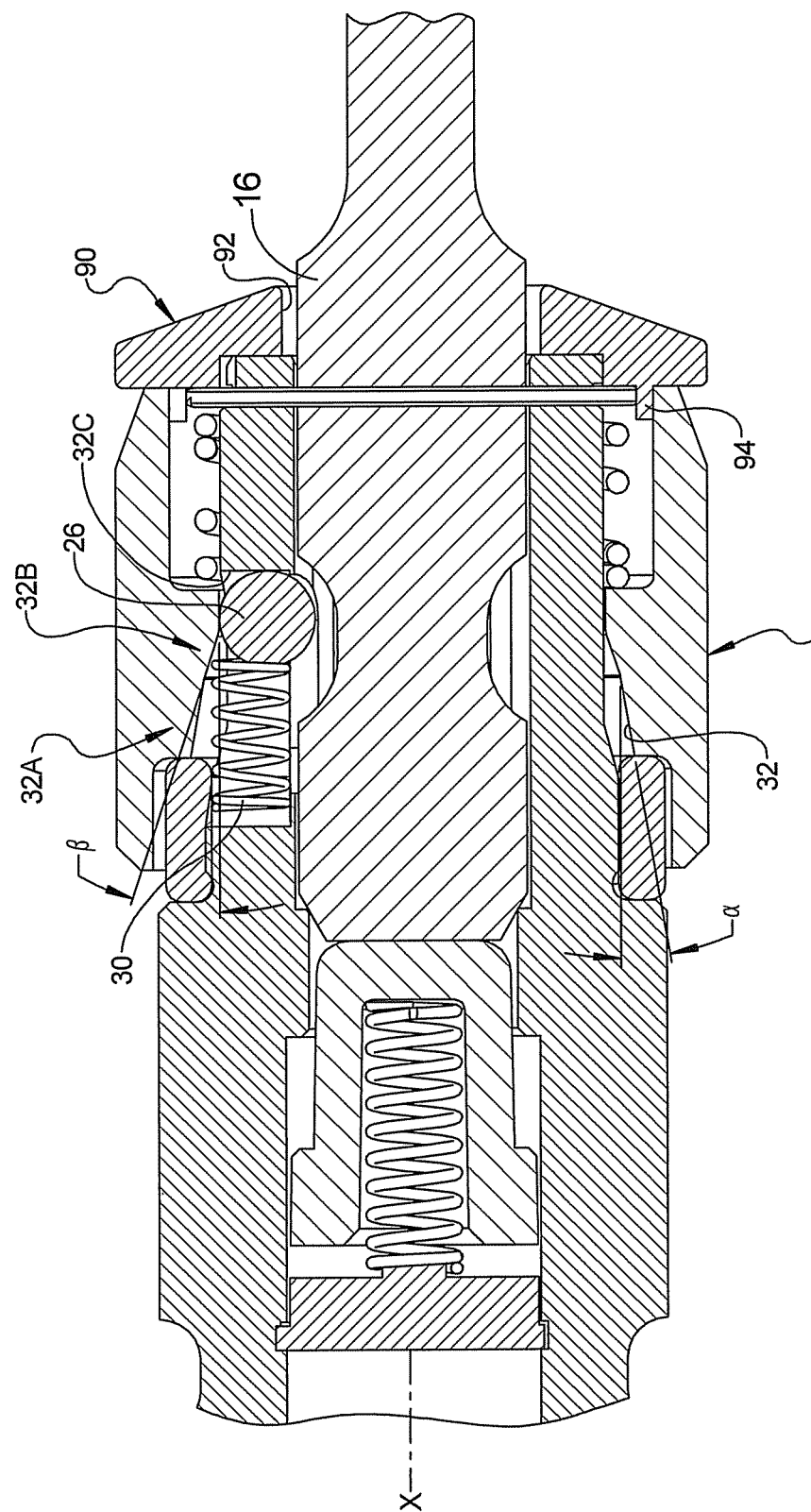
FIG. 13 is a cross-sectional view of the nose magnet applied to a bit retention device according to the principles of the present disclosure.

As shown in FIGS. 12-13, a nose magnet 90 can have an annular shape with a central aperture 92 magnet 90 has concentric ribs 94 that conform to the front of the shaft 12 and sleeve 22 to locate the magnet 90 and hold it concentric to the bit retention device 10. The magnet holds to the shaft in sleeve and holds a fastener in engagement with the bit 16 because the nose magnet 90 is external to the bit retention device 10, it does not attract metal debris inside the bit retaining device 10. Furthermore, the magnet 90 can be adhered to the actuator sleeve or otherwise connected thereto so that the magnet does not become dislodged from the bit retention device 10. Alternatively, the nose magnet 90 can be removably attached under its magnetic traction to the actuator sleeve 22 so that it can be easily removed and reinserted by the user, as desired.

Figure 14:
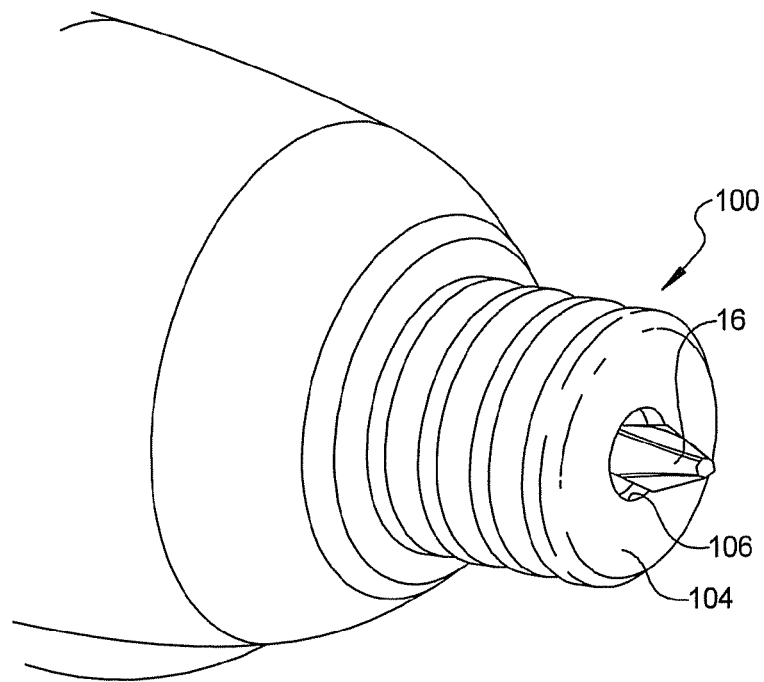
FIG. 14 is a perspective view of a non-marring nose cover applied to the bit retention device of the present disclosure.
Figure 15:
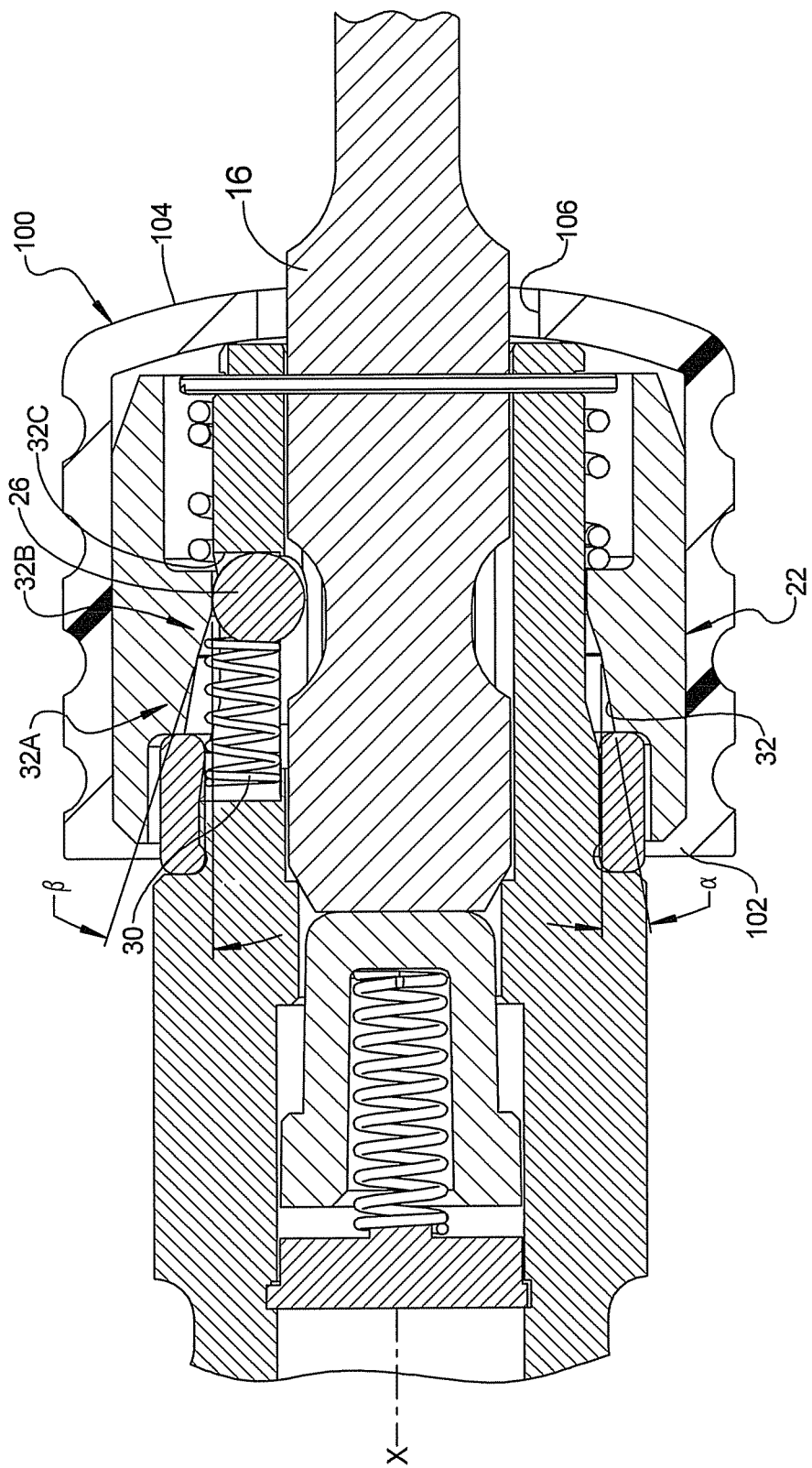
FIG. 15 is a partial cross-sectional view of the non-marring nose cover applied to a bit retention device according to the principles of the present disclosure.

With reference to FIGS. 14-15, a non-marring nose cover 100 can be disposed over the bit retention device 10. The non-marring nose cover 100 can be made of a plastic or elastomeric material and can be formed such that it can be slipped over the actuator sleeve 22 and retains itself in place with a slight interference or wrap around portion 102 that wraps around the proximal end of the actuator sleeve 22. The nose cover 100 can further include a distal end portion that wraps over the end portion of the bit retention device 10 with a central aperture 106 for receiving a bit 16 therein. The non-marring nose cover 100 prevents the knurled metal sleeve 22 from marring a work material. The forward portion 104 reduces or eliminates infiltration of dust and debris into the bit retention device allowing it to operate more smoothly for a longer period of time. The aperture 106 in the forward portion 104 can fit snugly around the bit 16.

Figure 16:
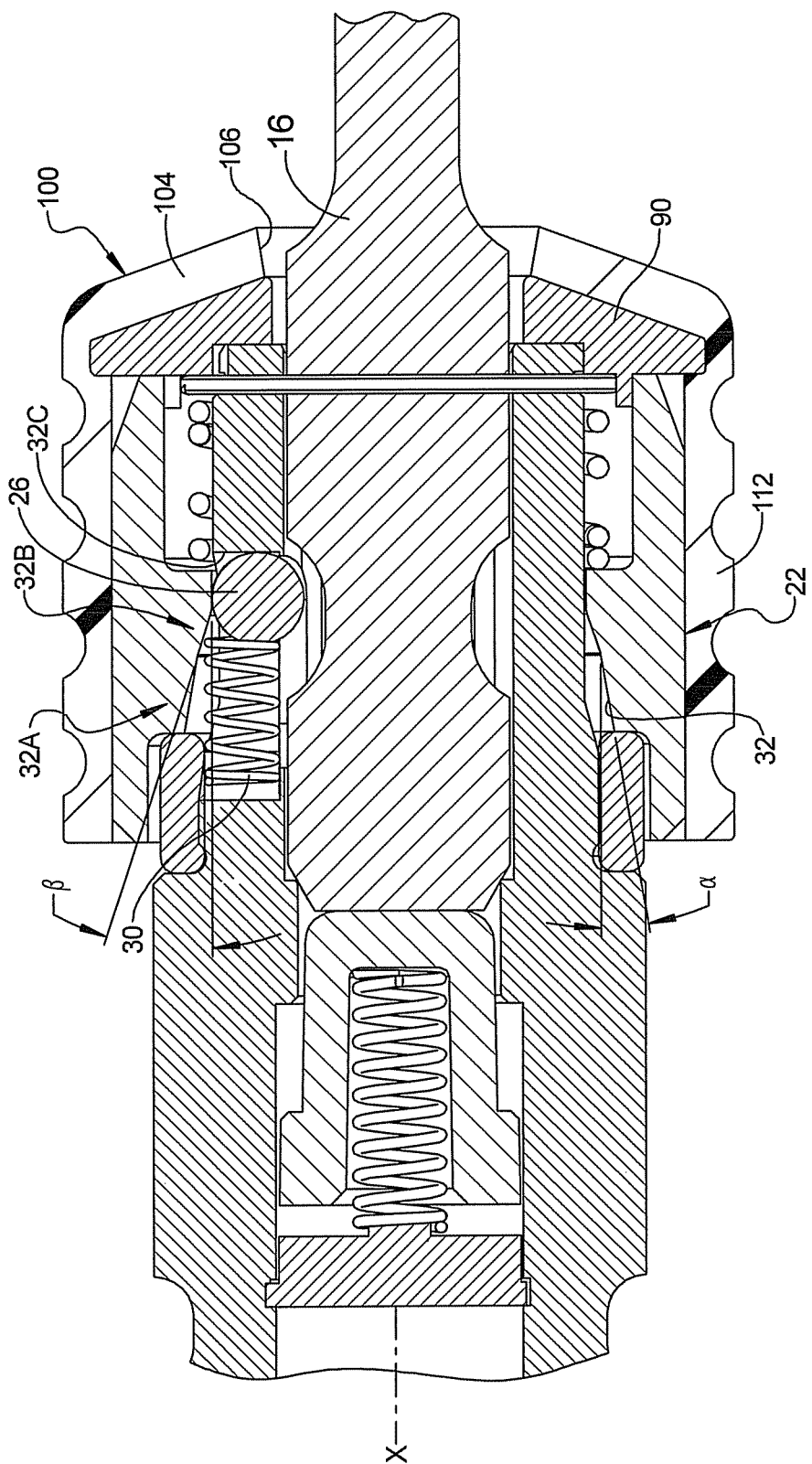
FIG. 16 is a cross-sectional view of a combined nose magnet and nose cover assembly according to the principles of the present disclosure.

As shown in FIG. 16, the bit retention device 10 can further be provided with an over-molded magnetic nose cover 110. The over-molded magnetic nose cover 110 can include a nose magnet 90 constructed generally as described above. A plastic cover 112 can be over-molded on the nose magnet 90 or alternatively, the nose magnet 90 can be inserted into the cover 112. The cover 112 can be made of plastic or elastomer and is designed to prevent the knurled metal sleeve 22 from marring the work material. A slight interference between the cover 112 and the sleeve 22 may retain the cover onto the shaft or, alternatively, a wrap around portion or adhesives can be utilized for securing the cover 112 onto the actuator sleeve 22. In assembled condition as illustrated in FIG. 16, the nose magnet 90 will attract a fastener to the bit 16 hold the fastener in place. Furthermore, the cover portion 112 protects the work piece from being marred while a fastener is being inserted. It should be noted that the magnet 90 may also retain the cover onto the shaft to provide a cover 112 and magnet 90 that can be easily removed as desired by the user.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A bit retention device, comprising:
a shaft having a sidewall defining a bit receiving cavity extending from a first end thereof and a ball groove extending through said sidewall and communicating with said bit receiving cavity;
a ball disposed in said ball groove;
a ball spring engaging said ball and biasing said ball toward said first end;
an actuator sleeve surrounding said shaft and including an internal ramp engaging said ball, said internal ramp including a first shallow ramp portion having a first angle of inclination with respect to a center axis of said shaft, a second steep ramp portion having a second angle of inclination with respect to said center axis of said shaft that is greater than said first angle of inclination, said second steep ramp portion having a smaller diameter than said first shallow ramp portion and a third generally cylindrical portion disposed adjacent to said second steep ramp portion with said second steep ramp portion disposed between said first shallow ramp portion and said third generally cylindrical portion, wherein each of said first shallow ramp portion, said second steep ramp portion and said third generally cylindrical portion are adapted to engage an outer surface of the ball.

2. The bit retention device according to claim 1, further comprising an actuator spring biasing said actuator sleeve away from said first end of said shaft.

3. The bit retention device according to claim 1, wherein said ball groove extends in an axial direction and a spring retainer sleeve surrounds a rearward portion of said ball groove and retains said ball spring in said ball groove.

4. The bit retention device according to claim 3, wherein said actuator sleeve is slidably mounted on an exterior surface of said spring retainer sleeve.

5. The bit retention device according to claim 4, wherein said actuator sleeve includes an interior shoulder that abuts against said spring retainer sleeve when said actuator sleeve is in a rearward-most position.

6. The bit retention device according to claim 1, wherein said bit receiving cavity has a polygonal cross-section.

7. The bit retention device according to claim 1, wherein said bit retention device is operable to retain a first bit having an annular groove in a surface thereof with said ball being pushed into the annular ball groove by said steep ramp portion and said bit retention device is operable to retain a second bit without an annular ball groove with said ball being disposed between said shallow ramp portion and a surface of said second bit.

8. The bit retention device according to claim 7, wherein when said first bit having an annular groove in a surface thereof is inserted into said bit retention device, a distance between said internal ramp and a rearward edge of said annular groove is greater than a diameter of said ball.

9. The bit retention device according to claim 1, wherein said first angle of inclination of said shallow ramp portion is between 5 and 15 degrees.

10. The bit retention device according to claim 9, wherein said second angle of inclination of said steep ramp portion is between 13 and 23 degrees.

11. The bit retention device according to claim 1, further comprising an elastomeric cover disposed over a forward end of said actuator sleeve.

12. The bit retention device according to claim 1, further comprising a nose magnet attached to a forward end of said actuator sleeve.

13. The bit retention device according to claim 12, further comprising an elastomeric cover disposed over said nose magnet.

14. A bit retention device, comprising:
a shaft having a sidewall defining a polygonal cavity extending from a first end thereof, a ball groove extending through said sidewall and communicating with said polygonal cavity and a bore extending axially from said polygonal cavity;
a ball disposed in said ball groove;
a ball spring disposed in said ball groove and engaging said ball and biasing said ball toward said first end;
an actuator sleeve surrounding said shaft and including an internal ramp engaging said ball; and
a spring biased plunger assembly disposed in said bore for biasing a bit received in said bore in a direction toward said first end, wherein said actuator sleeve is free from any device holding said actuator sleeve in an open position such that a bit can be inserted into said bit retention device without any need for the actuator sleeve being held in said open position, wherein said ball groove extends in an axial direction and a spring retainer sleeve directly surrounds said shaft and only a rearward portion of said ball groove and only a rearward portion of said ball spring to retain said ball spring in said ball groove.

15. The bit retention device according to claim 14, wherein said bit retention device includes only one spring loaded ball.

16. The bit retention device according to claim 14, further comprising an actuator spring biasing said actuator sleeve away from said first end of said shaft.

\* \* \* \* \*